Feb. 23, 1926.
I. W. LEVINE
1,573,978
ELECTRIC INSULATING TAPE
Filed August 30, 1924
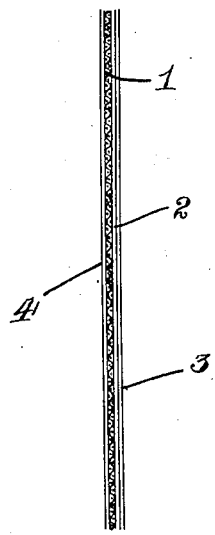
Inventor
Irving W. Levine
By William Clinton
Attorney Patented Feb. 23, 1926.

1,573,978

UNITED STATES PATENT OFFICE.

IRVING W. LEVINE, OF WESTMOUNT, QUEBEC, CANADA.

ELECTRIC INSULATING TAPE.

Application filed August 30, 1924. Serial No. 735,199.

*To all whom it may concern:*

Be it known that I, IRVING W. LEVINE, a citizen of the United States of America, residing at Westmount, Province of Quebec, Canada, have invented certain new and useful Improvements in Electric Insulating Tape; and I do hereby declare that the following is a full, clear, and exact description of the invention, such as will enable others skilled in the art to which it appertains to make and use the same.

It has been the practice in the past, when splicing wire, to wrap the same with a rubber splicing compound, (compounded tape) and then to cover this compounded tape with a regular so-called friction tape which holds the first tape in place and protects the same from the weather when used out of doors. My invention relates to an improvement both in the quality of the tape and the manner of applying it. More specifically, the rubber splicing compound and the friction tape are replaced by the new tape alone which not only has the properties of the splicing compounded friction tape, but also is self vulcanizing and affords a more durable joint.

In general, the improved tape is made by first driving the moisture from the cloth or sheeting which forms the foundation fabric. This preliminary treatment is followed by other treatments which render the fabric waterproof and also give it a greater resistance to the breakage of electricity. Further, such a cloth or sheeting will repel moisture when used in damp places. For the waterproofing, I prefer to use cumar dissolved in naphthaline and carbon-tetrachloride, or any suitable coal-tar or commercial solvent. Cumar is a mixture of para-cumarone, para-indene and the polymers of other hydrocarbons found in coal-tar. Next, one or both sides of the material are covered with a layer having self curing or setting properties. This layer is covered on one side of the tape with an outer layer of non-air curing properties, this layer being called the friction coat. The face side, that is the side opposite the one carrying the friction coat, is now treated with a substance having a high dielectric resistance. This substance replaces the usual splicing compound and is applied whether or not the face of the foundation fabric has been given a coat of the first mentioned air curing material.

The accompanying drawing shows in diagrammatic manner a tape constructed in accordance with the invention.

The numeral 1 indicates the foundation fabric, one or both sides of which may be treated with a base coat 2 of air curing or self setting properties. The base stock is preferably made according to the following composition:

| | |
|---|---|
| Mineral rubber | 10 lbs. |
| Blended rubber | 10 " |
| Good grade of reclaimed | 25 " |
| Cumar | 02 " |
| Liquid rubber | 02 " |
| Lamp black | 01 " |
| Zinc oxide | 05 " |
| Barytes | 30 " |
| Flour sulphur | 0.1 lb. |
| Super-sulphur #1 | 1 lb. 8 oz. |

Super-sulphur #1 is the oxidized zinc salt of dimethyl-di-thio-carbamic acid built on a clay base. This material is described in United States Patent No. 1,436,894 and is sold to the rubber trade to be used as a rubber accelerator.

It will be seen that this mixture is rich in mineral rubber or hydrocarbon and a synthetic resinous composition which also carries sulphur and an organic accelerator, as well as other ingredients having a high dielectric resistance.

One side of the tape is next treated with a friction coat 3 applied over the base coat 2. The friction coat, as distinguished from the coat 2, is non-air curing. It is further characterized in that it is non-air drying so as to retain its adhesive qualities. The friction coat preferably has the following composition:

| | |
|---|---|
| Blended rubber | 22 lbs. |
| Good grade reclaimed | 24 " |
| Cumar | 01 " |
| Liquid rubber | 02.8 oz. |
| Pine tar flux | 03 lbs. |
| Wool grease | 01 " |
| Mineral rubber | 02 " |
| Zinc | 03 " |
| Whiting | 10 " |

The remaining side of the fabric, whether or not it has been treated with the base coating substance, is now given a face coat, the essential properties of which are:

(1) That it has a high dielectric resistance;

(2) That it contains an organic accelerator; and, (3) That it resists water, oil, alkali and moisture. This mixture is preferably made up as follows:

| | | |
|---|---|---|
| Blended rubber | 33 | lbs. |
| Mineral rubber | 05 | " |
| Paraffine wax | 01 | " |
| Pine tar | 00-5 | oz. |
| Reclaimed rubber | 12 | lbs. |
| Litharge | 01 lb. 8 | oz. |
| Sulphur | 01 " 8 | " |
| Lithophone | 05 | lbs. |
| Dixie clay | 10 | " |
| Carbon black | 01 | " |
| Thio-carbanilide | 00-8 | oz. |
| Whiting | 30 | lbs. |

Super-sulphur #1 may be used in place of thio-carbanilide.

The tape thus prepared is wound around a core in a well known manner, but a strip of paper or linen is interposed between the windings in order to prevent them from sticking together.

The purpose of the base coat 2 beneath the outer friction coat 3 is to prevent the softeners such as liquid rubber, pine tar flux and wool grease from working through the sheeting into the face coat 4 and softening the face coat so that it would not be suitable for insulating purposes. This action is accomplished by the presence in the coat 2 of 30 lbs. barytes, 5 lbs. of zinc oxide and 25 lbs. of reclaimed rubber which will absorb any excess of oil that may be present in coat 2.

Coat 3 is prevented from becoming vulcanized under the influence of the accelerator in coat 2 by the fact that coat 3 contains the softeners, cumar, liquid rubber, pine tar and wool grease, and does not carry any free sulphur or accelerator to assist in the vulcanization.

In use, the tape is wound around the joint in the usual manner, except that no splicing compound is used. The material 4 engages the bare wire and replaces the splicing compound. The non-air drying friction coat 3 has retained its adhesive qualities due to the fact that it is wound on the core in such a way as not to be exposed to the air. Therefore, when the tape is wound around the joint, the several turns stick to one another, the layer 3 being engaged by the layer 4 of the next turn. Coat 4 is more active than coat 2, owing to the presence of the softeners in the latter, and the organic accelerator contained in the face coating 4 is now free to act upon the non-air curing substance 3 whereupon the latter now becomes vulcanized and acquires a permanent set. Also, the accelerator in coat 2 assists in setting the whole mass since the coat 3 will now become more readily vulcanized owing to the fact that it is in contact with an accelerator at either side. It is to be noted particularly that the vulcanizing of the friction coat 3 does not occur until the tape is actually in use.

It will be understood that the above mentioned formulas may be varied to suit particular requirements or to emphasize any particular properties. It is only necessary that the general properties by which they are characterized be retained.

Having thus fully described the invention, what I claim as new and desire to protect by Letters Patent is:—

1. An insulating tape comprising a foundation strip fabric, one side of said strip being coated first with a layer having air curing properties, and then with a second layer having non-air curing properties, the other side of the strip being provided with a face coat having high dielectric resistance and greater air-curing properties than the first named layer.

2. An insulating tape comprising a foundation strip fabric, one side of said strip being coated first with a layer having air curing properties, and then with a second layer having non-air curing properties, the other side of the strip being provided with a face coat having high dielectric resistance and containing an organic accelerator, said face coat having greater air-current properties than the first named layer.

3. An insulating tape comprising a foundation strip fabric, said fabric being waterproof, one side of said strip being coated first with a layer having air curing properties, and then with a second layer having non-air curing properties, the other side of the strip being provided with a face coat having high dielectric resistance and greater air-curing properties than the first named layer.

4. An insulating tape comprising a foundation strip fabric, one side of said strip being coated first with a layer having air curing properties, and then with a second layer having non-air curing and non-drying properties, the other side of the strip being provided with a face coat having high dielectric resistance and greater air-curing properties than the first named layer.

In witness whereof I have hereunto set my hand.

IRVING W. LEVINE.